United States Patent Office 3,166,357
Patented Jan. 19, 1965

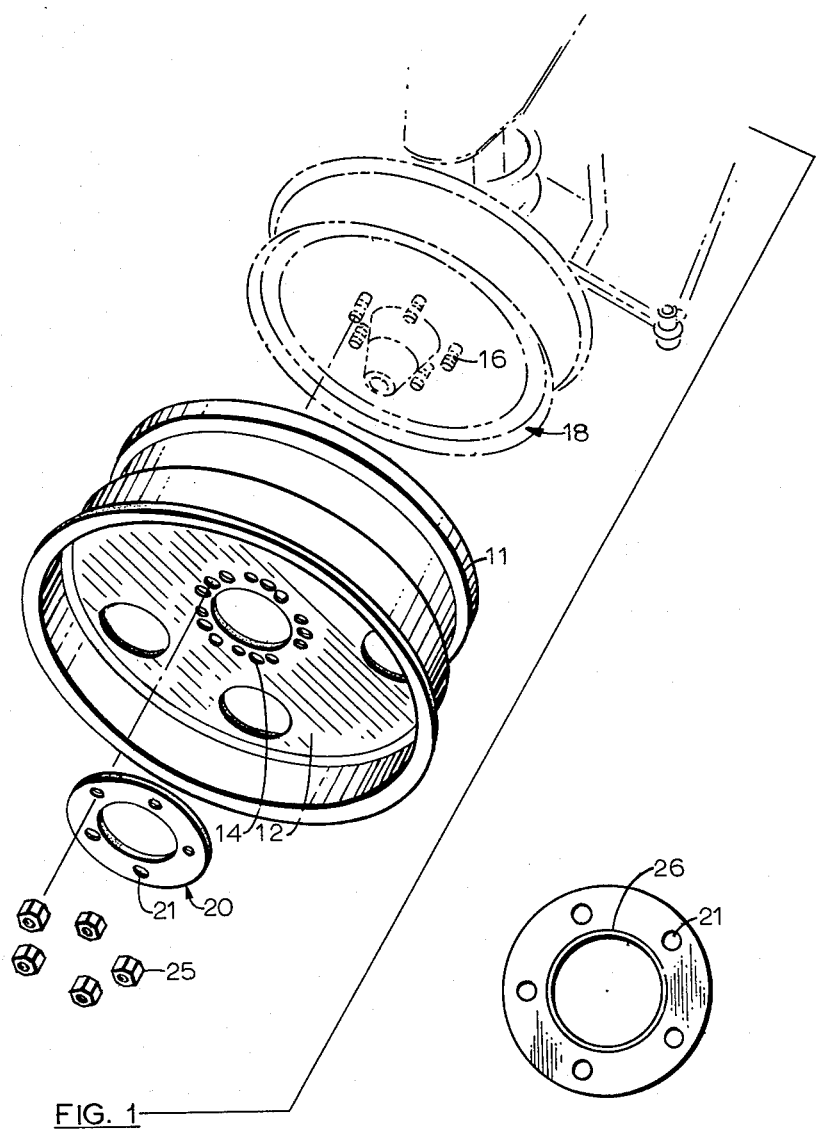

3,166,357
CUSTOM WHEEL INSTALLATION
Roy R. Vachon, Inglewood, and Merlyn R. Reppert, Torrance, Calif., assignors to Appliance Plating Co. Inc., Gardena, Calif., a corporation of California
Filed Aug. 8, 1963, Ser. No. 300,762
2 Claims. (Cl. 301—9)

This invention relates to a custom wheel installation and more particularly to such an installation adaptable for universal mounting on different types of automobiles.

Automobile enthusiasts quite often purchase custom made wheels to replace the conventional ones which came with the car. Such custom made wheels are designed to aesthetic configuration and are generally chrome-plated. In the prior art, separate types of wheels must be made for each make of automobile in view of differences in mounting dimensions provided in different cars. This necessity for providing wheels to different dimensions for each separate make car increases the cost of fabrication and also makes it necessary for the dealer to inventory a large variety of units. In making a custom wheel, a new hub of aesthetic design is installed on the wheel rim. In the devices of the prior art, the hubs utilized have to be of considerable thickness to provide the necessary structural strength at the points of attachment to the wheel drum member. With such thick hubs it is difficult to stamp out the necessary holes, and oftentimes this must be accomplished by flame cutting which is a fairly expensive process as compared with stamping. It is also more difficult to attach thicker hubs to wheel rims.

The device of this invention overcomes the shortcomings of the prior art in providing a wheel member having a hub suitable for universal use with a great variety of makes of automobiles. By utilizing an alignment plate for each particular make of car, the hub can be adapted for any one of these makes of cars without any sacrifice of the aesthetic qualities of the installation. The alignment plate has a register thereon which assures precise centering of the wheel, and such alignment plate provides additional structural strength at the point of attachment. The use of the alignment plate permits the utilization of a hub unit of thinner dimension which can be readily stamped out and more easily attached to the wheel rims at considerable savings over the fabrication techniques generally necessary with the thicker hubs of the prior art. The structural strength provided by the alignment plate in conjunction with the hub is equivalent to that provided by the thicker hubs of the prior art so that there is no sacrifice of structural strength over prior art devices.

It is therefore an object of this invention to provide an improved custom automobile wheel installation.

It is a further object of this invention to provide a custom automobile wheel installation of more economical fabrication than prior art devices.

It is a further object to provide an automobile wheel custom installation which is suitable for universal use.

It is still a further object of this invention to facilitate the fabrication of custom wheel installations.

Other objects of this invention will become apparent from the following description taken in connection with the accompanying drawings of which:

FIG. 1 is an exploded view of a preferred embodiment of the device of the invention, and FIG. 2 is a bottom view of the alignment plate utilized in the device of the invention.

Referring now to FIG. 1, a preferred embodiment of the device of the invention is illustrated. Attached to wheel rim 11 is custom-made hub 12. This hub is made to any desired aesthetic configuration and is attached to rim 11 by suitable means such as welding. A plurality of holes 14 are punched around the center of hub 12. These holes form various sets, each such set being suitable for utilization with a particular type of automobile. Thus, a particular set comprising five of these holes will align with the five threaded studs 16 projecting from wheel drum 18.

Alignment plate 20 has holes 21 formed therein which align with one of the sets of holes 14 on hub 12 and with the studs 16 protruding from rim 18. This particular plate is designed for utilization with the particular automobile involved of which drum 18 is a part. A separate alignment plate 20 is provided for each make and/or model automobile, hub 12 thus being adaptable for use with all of such models or makes.

With hub 12 installed on studs 16 through the appropriate holes therein and alignment plate 20 installed over the hub on studs 16, nuts 25 are utilized to attach the wheel to wheel drum 18.

Referring now to FIG. 2, a bottom view of the alignment plate 20 utilized in the device of the invention is shown. The washer-shaped alignment plate has a register 26 in the form of a circular raised rim which runs around the inner circumference thereof and which is in concentricity with the plate. Register 26 assures that the wheel will be properly centered on drum 18.

Sets of holes 14 can be punched in hub 12 to provide for a number of different types of car installations the only limitation on the number of such installations being the area available around the inner portion of the hub to accomodate such perforations. The strength of the hub at the attachment point is adequately bolstered by alignment plate 20 which is of substantial construction so that there is no sacrifice of structural strength by virtue of the perforation of the hub or with the utilization of thinner material for such hub than is utilized in the devices of the prior art.

The device of this invention thus provides a simple yet highly effective means for universalizing the utilization of wheel members for custom installations. In addition to its universal utilization, the cost of fabrication of the device of the invention is considerably less than prior art devices without any sacrifice of structural strength.

While the invention has been described and illustrated in detail, it is to be clearly understood that this is intended by way of illustration and example only and is not to be taken by way of limitation, the spirit and scope of this invention being limited only by the terms of the following claims.

We claim:

1. A custom wheel installation for an automobile comprising
    an automobile wheel drum having a plurality of mounting studs protruding therefrom,
    a wheel rim,
    a hub fixedly attached to said wheel rim, said hub having a relatively large circular aperture formed therein at the central portion thereof, said hub further having a plurality of sets of relatively small apertures, each set comprising at least five apertures with each set being adapted for utilization with a particular type of automobile and each of the apertures in said sets being of a diameter substantially equal to that of said studs and being formed in said hub surrounding said relatively large aperture,
    an alignment plate having a relatively large circular aperture formed therein at the center thereof, said alignment plate further having a plurality of sets of relatively small apertures surrounding said large aperture, said alignment plate further having a circular rim-like register integral with said plate running adjacent to said large aperture formed therein, the outer diameter of said register being substantially equal to the diameter of the large aperture formed in said hub, and means for attaching said hub and said alignment plate to the studs protruding from said wheel drum, one of the sets of apertures in said hub and the relatively small apertures in said alignment plate mating with said studs and said register abutting against the portion of said hub surrounding the relatively large aperture formed therein.

2. The device as recited in claim 1 wherein said mounting studs are threaded and said means for attaching said hub and said alignment plate to said studs comprises a plurality of nuts.

References Cited by the Examiner
UNITED STATES PATENTS

| | | | |
|---|---|---|---|
| 1,860,665 | 5/32 | Eksergian | 301—9 |
| 2,516,896 | 8/50 | Manning | 301—9 |
| 2,590,363 | 3/52 | Adair | 301—9 |

ARTHUR L. LA POINT, *Primary Examiner.*